(12) United States Patent
Vom Stein et al.

(10) Patent No.: US 6,896,098 B2
(45) Date of Patent: May 24, 2005

(54) LID FOR MUFFLING NOISES PRODUCED BY AN INTERNAL COMBUSTION ENGINE, AND METHOD FOR PRODUCING SUCH LID

(75) Inventors: Hans-Joachim Vom Stein, Leverkusen (DE); Eric Schmuck, Leverkusen/Opladen (DE)

(73) Assignee: AB SKF, Gothenburg (SE)

( * ) Notice: Subject to any disclaimer, the term of this patent is extended or adjusted under 35 U.S.C. 154(b) by 196 days.

(21) Appl. No.: 10/127,549

(22) Filed: Apr. 23, 2002

(65) Prior Publication Data

US 2002/0170775 A1 Nov. 21, 2002

(30) Foreign Application Priority Data

Apr. 24, 2001 (DE) .......................... 101 19 892

(51) Int. Cl.[7] .......................... F01N 1/04; F16M 13/00; F16F 9/30; F16F 7/10
(52) U.S. Cl. .................... 181/204; 181/207; 248/562; 248/570; 188/268; 188/379
(58) Field of Search .................. 181/204, 205, 181/207, 209, 200; 248/562, 564, 570, 634, 636; 188/265, 378, 379, 380; 49/9; 123/90.38, 90.37; 277/591, 596–598

(56) References Cited

U.S. PATENT DOCUMENTS

| | | | | |
|---|---|---|---|---|
| 2,111,326 A | * | 3/1938 | Norris | 52/275 |
| 3,090,463 A | * | 5/1963 | Yanda | 181/204 |
| 3,692,335 A | | 9/1972 | Vickers et al. | |
| 3,773,142 A | | 11/1973 | Bragg et al. | |
| 3,822,763 A | * | 7/1974 | Adams et al. | 181/204 |
| 4,027,644 A | * | 6/1977 | Timour | 123/198 E |
| 4,493,390 A | * | 1/1985 | Pagano et al. | 181/204 |
| 4,522,165 A | * | 6/1985 | Ogawa | 123/195 C |
| 4,655,496 A | * | 4/1987 | Gahlau et al. | 296/39.3 |
| 4,719,892 A | | 1/1988 | Lopez-Crevillen | |
| 4,773,624 A | * | 9/1988 | Affenzeller et al. | 248/638 |
| 4,836,160 A | * | 6/1989 | Valev | 123/198 E |
| 5,005,810 A | * | 4/1991 | Sawada et al. | 267/140.13 |
| 5,364,109 A | * | 11/1994 | Sihon | 277/592 |
| 5,365,901 A | | 11/1994 | Kiczek | |
| 5,368,797 A | * | 11/1994 | Quentin et al. | 264/152 |
| 5,513,603 A | * | 5/1996 | Ang et al. | 123/90.37 |
| 5,631,451 A | * | 5/1997 | Torisaka et al. | 181/207 |
| 5,655,489 A | | 8/1997 | Kammerer et al. | |
| 5,957,100 A | | 9/1999 | Frohwerk et al. | |
| 6,691,667 B2 | * | 2/2004 | Salameh | 123/195 C |

FOREIGN PATENT DOCUMENTS

| | | | | |
|---|---|---|---|---|
| DE | 2356187 A | * | 5/1975 | ........... F02B/77/00 |
| DE | 26 38 982 A1 | | 3/1978 | |
| DE | 3346421 A1 | * | 7/1985 | ........... F02B/77/13 |
| DE | 197 01 198 A1 | | 8/1997 | |
| EP | 46923 A2 | * | 3/1982 | ........... F02B/77/13 |
| GB | 1 218 734 | | 1/1971 | |
| GB | 1 229 408 | | 4/1971 | |
| GB | 2 036 660 A | | 7/1980 | |
| JP | 10260065 A | * | 9/1998 | ........... G01D/11/30 |

* cited by examiner

*Primary Examiner*—Robert Nappi
*Assistant Examiner*—Edgardo San Martin
(74) *Attorney, Agent, or Firm*—Burns, Doane, Swecker, Mathis, L.L.P.

(57) ABSTRACT

A lid adapted to be mounted on the cylinder head of an internal combustion engine by attachment screws includes a cap and a carrier element adapted to be attached to the cylinder head by the attachment screws. To achieve an improved sound decoupling, the cap and the carrier element are connected to an elastomer component, with the connection between the cap and the carrier element being, at least in part, exclusively constructed by the elastomer component, and with a space being provided between the cap and the carrier element. The carrier element possesses a substantially straight section arranged to extending preferably at a right angle to the attachment surface of the cylinder head, the substantially straight section of the carrier element, a portion of the elastomer component adjacent the cap, and a portion of the cap adjacent the carrier element extend in a straight line.

29 Claims, 3 Drawing Sheets

LID FOR MUFFLING NOISES PRODUCED BY AN INTERNAL COMBUSTION ENGINE, AND METHOD FOR PRODUCING SUCH LID

This application is based on and claims priority under 35 U.S.C. §119 with respect to German Application No. 101 19 892.2 filed on Apr. 24, 2001, the entire content of which is incorporated herein by reference.

FIELD OF THE INVENTION

The present invention generally relates to a mechanism for reducing noises produced by an internal combustion engine. More particularly, the present invention pertains to a lid attached to an engine assembly component, particularly to a cylinder head block, by way of attachment elements for muffling noises produced by an internal combustion engine, and a method of producing such a lid.

An example of a cap for muffling noises produced by an internal combustion engine is disclosed in German Offenlegungsschrift No. 26 38 982. The noise muffling cap is wrapped in the area of the cylinder head block, with the cap being held to the cylinder head block by way of a carrier element and with the carrier element being attached to the cylinder block head by attachment screws.

Although previously known lids for muffling vibrations is able to muffle engine noise to some extent, it would be desirable to provide a lid capable of achieving improved noise muffling, yet capable of being produced in a more simplified manner.

A need thus exists for an improved lid of the type mentioned above which permit production in a particularly cost effective manner while also enabling an effective sound decoupling of the cylinder head block. The structure-borne sound from the cylinder head block should therefore be muffled as much as possible, and transferred to the lid as little as possible.

SUMMARY OF THE INVENTION

According to one aspect, a lid mounted on the upper portion of a cylinder head of an internal combustion engine by attachment screws to muffle noises produced by the internal combustion engine includes a cap and a carrier element attached to an attachment surface of the cylinder head by the attachment screws. The cap and the carrier element are connected to an elastomer component, with the connection between the cap and the carrier element being, at least in part, exclusively constructed by the elastomer component, and with a space being provided between the cap and the carrier element. The carrier element possesses a substantially straight section extending at an angle to the attachment surface of the cylinder head. The substantially straight section of the carrier element, a portion of the elastomer component adjacent the cap, and a portion of the cap adjacent the carrier element extend in a straight line.

This lid advantageously achieves a minimum structure-borne sound transmission from the carrier element to the cap. In addition, by virtue of the defined geometrical design of the carrier element in which the section essentially extends at a right angle toward the attachment surface and the attachment of the cap is exclusively by way of the elastomer component, both an optimal sound decoupling and a high degree of stability of the entire assembly component is achieved. The straight section of the carrier element extends at an angle of at least 60° toward the attachment surface of the cylinder head, preferably extends at angle between 60° and 90° with respect to the attachment surface, and most preferably extends at a right angle to the attachment surface.

The cap, the carrier element, and the elastomer component are preferably connected or formed in situ by an injection molding process or a vulcanization process. The minimum distance between the carrier element and the cap that is exclusively formed by the elastomer component is preferably a minimum of 3 mm, preferably at least 5 mm.

The carrier element may be a frame component equipped with attachment bores and adapted to the contour of the engine assembly component. To increase the stability of the assembly component, it is beneficially intended that a coupling agent is arranged between the cap and the elastomer component and/or between the elastomer component and the carrier element.

A relatively optimal sealing of the entire assembly component at the cylinder head block can be achieved when the elastomer component is formed in such a way that it forms a seal lip reaching beyond the attachment surface of the carrier element in the non-assembled state. In addition, the carrier element preferably possesses an essentially U-shaped form, with the elastomer component attached to one leg of the U-shaped carrier element for the connection to the cap, and designed at the other leg of the U-shaped carrier element in such a way that it provides a fastening nose for attachment of an additional lid element.

Additionally, the U-shaped carrier element can beneficially be constructed, at least sections of it, to consist of a crimped sheet metal, the sides of which have been placed on top of each other or in overlapping relation. The carrier element is preferably made of sheet metal and the elastomer component preferably consists of rubber or silicone. The cap itself is usually made of plastic, particularly polyamide.

In accordance with another aspect, a lid mounted on an upper portion of an engine assembly component of an internal combustion engine by way of attachment elements to muffle noises produced by the internal combustion engine includes a carrier element attached to the upper portion of the engine assembly component of the internal combustion engine by way of the attachment elements, with the carrier element having a substantially U-shaped configuration in cross-section including a bottom portion attached to the upper portion of the engine assembly component by the attachment elements and upstanding inner and outer side portions extending from the bottom portion. The lid also includes a cap and an elastomer component connecting an end of the cap to an end of the carrier element so that the end of the cap and the end of the carrier element, along at least a portion of the lid, are spaced apart from one another exclusively by a portion of the elastomer component.

Another aspect involves a method for producing a lid to be attached to an engine assembly component of an internal combustion engine by way of attachment elements to muffle noises produced by the internal combustion engine. The method involves positioning a cap and a carrier element in a tool, and injection molding elastomer material into the tool so that the cap and the carrier element are permanently connected to the elastomer material which forms an elastomer component of the lid, and so that the connection between the cap and the carrier element is as least in part exclusively formed by the elastomer component with a distance being provided between the cap and the carrier element.

BRIEF DESCRIPTION OF THE DRAWING FIGURES

The foregoing and additional features and characteristics of the present invention will become more apparent from the FIG. 1 is a cross-sectional view of the lid area of a cylinder head.

DETAILED DESCRIPTION OF THE INVENTION

Figure 1:
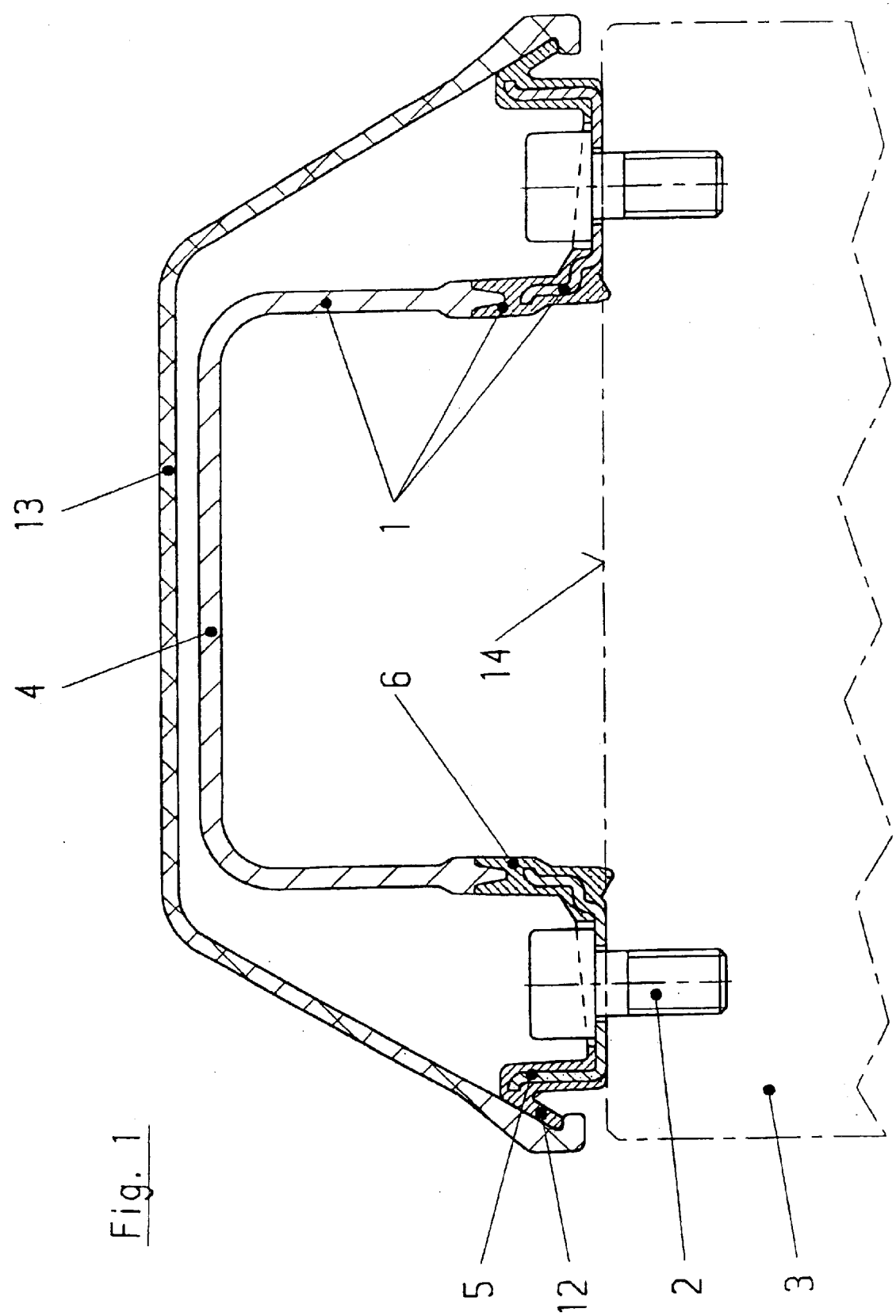

An engine assembly component 3 is outlined in the lower portion of FIG. 1 and corresponds to the upper portion of a cylinder head. A sound muffling lid 1 is arranged on the cylinder head for muffling noises produced by the internal combustion engine. On the one hand, this lid 1 must be firmly connected to the engine assembly component 3. On the other hand, the lid 1 must possess a sufficient structure-borne sound decoupling so that an effective noise muffling is possible.

The lid 1 is attached to the engine assembly component 3 by way of attachment screws 2. The lid 1 is comprised of a cap 4, a carrier element 5 and an elastomer component 6. The cap 4 is held by the carrier element 5 which is attached to the engine assembly component 3. The connection between the cap 4 and the carrier element 5 is achieved by the elastomer component 6. In a preferred form, the connection between the cap 4 and the carrier element 5 is, at least in a part of the lid, exclusively constructed by the elastomer component 6.

As shown in FIG. 1, the elastomer component 6 can be formed in such a way that it forms a lateral fastening nose(s) 12. This fastening nose(s) 12 is configured to hold an additional (second) lid element 13 and thus forms a fastening mechanism for fastening the second lid element to the lid 1. The additional lid element 13 encloses the cap 4 as an additional encasing and facilitates additional noise muffling.

Figure 2:
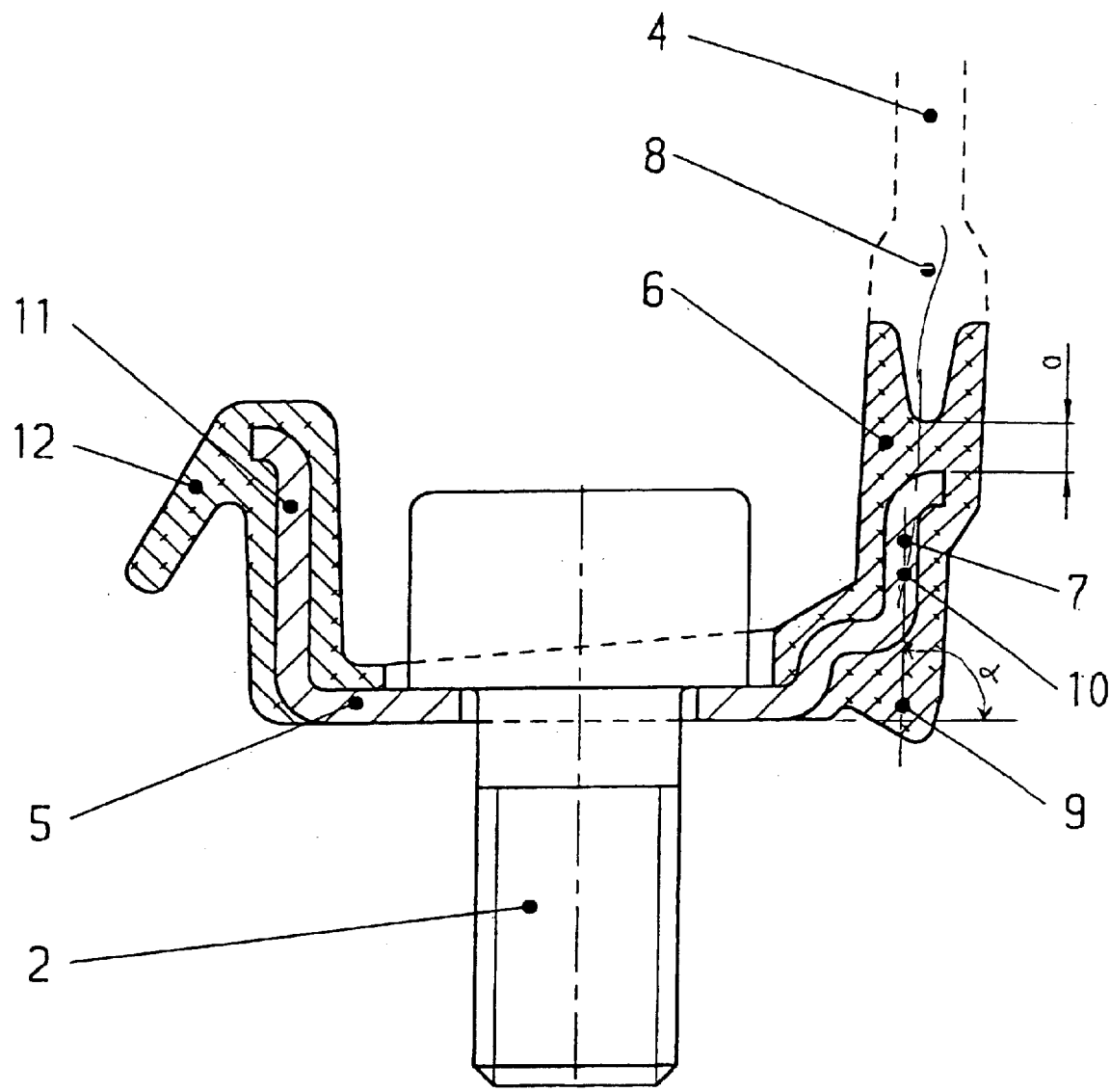
FIG. 2 is an enlarged cross-sectional view of the carrier element attached by an attachment screw.
Figure 3:
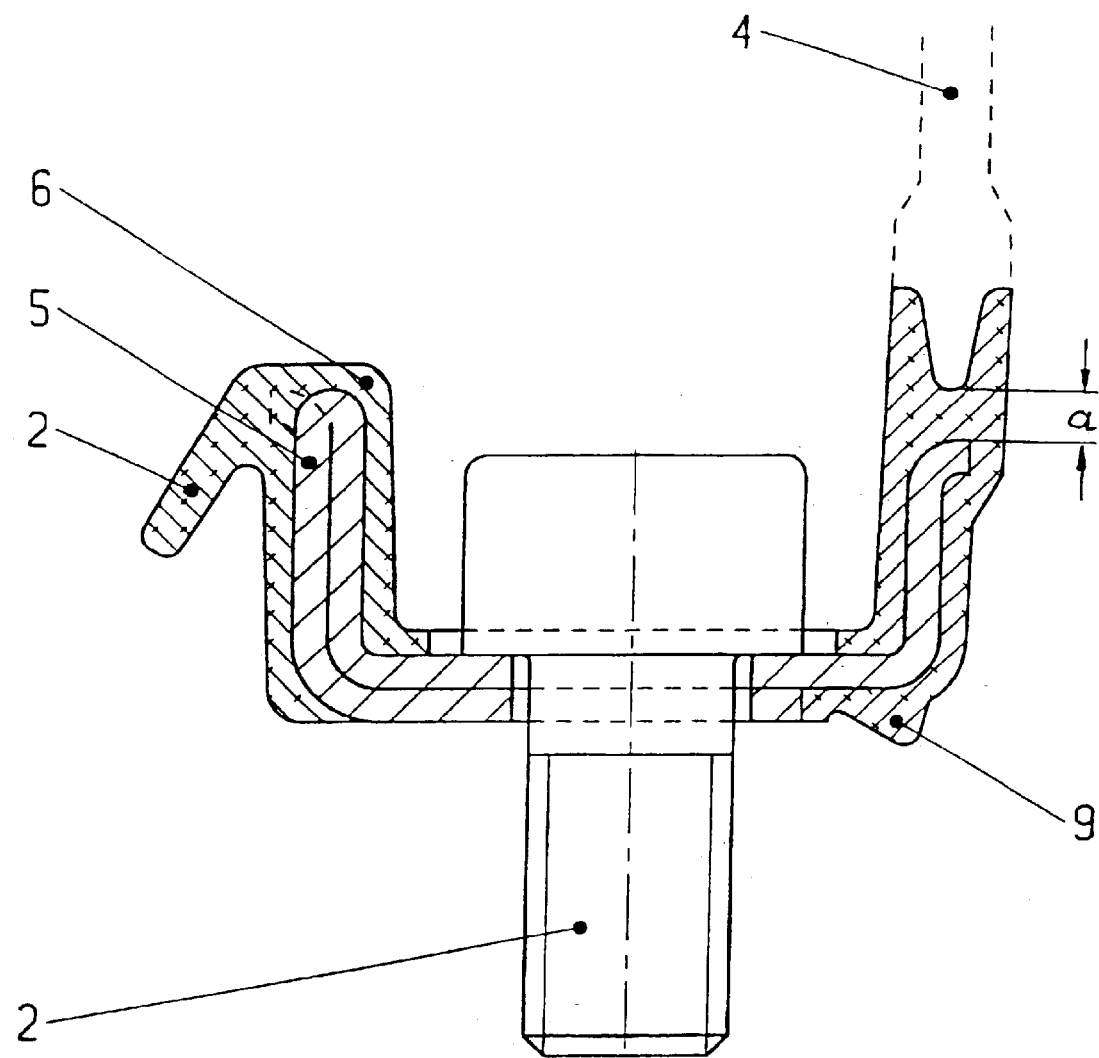
FIG. 3 is an enlarged cross-sectional view similar to FIG. 2, but illustrating a modified design of the carrier element.

Two alternative configurations of the carrier element 5 are illustrated in FIGS. 2 and 3. In the version shown in FIG. 2, the carrier element 5 is attached to the attachment surface 14 (see FIG. 1) of the engine assembly component 3 in the assembled state of the lid. The carrier element 5 is generally a frame-shape element and corresponds, in top view, to the contour of the cylinder head area. In the area of the attachment elements 2, the carrier element 5 has an essentially U-shaped contour or configuration in cross-section. This U-shaped cross-section is defined by a substantially flat bottom portion that is attached to the upper portion of attachment surface of the cylinder head 3 by the attachment screws 2, which pass through attachment bores in the bottom portion, and opposite upstanding side portions extending from the bottom portion.

The right side of the carrier element 5 shown in FIG. 2 forms a first leg 10 while the left side of the carrier element 5 shown in FIG. 2 forms a second leg. The first leg 10 of the U-shaped carrier element 5 generally forms one-half of the "U" while the second leg 11 of the U-shaped carrier element 5 generally forms the other half of the "U".

In the right side area of the carrier element 5 shown in FIG. 2, a substantially straight section 7 of the carrier element 5 is oriented at an angle α of at least 60° to the attachment surface 14, preferably at substantially a right angle α to the attachment surface 14 on which the carrier element 5 is attached. As a linear continuation of this section 7, section 8 continues on the cap 4. Thus, the section 7 of the carrier element 5, the portion of the elastomer component 6 adjacent the cap 4, and the section 8 of the cap 4 adjacent the carrier element essentially extend in a straight line. The transition from the one section 7 to the other section 8 is formed exclusively by the elastomer component 6, with a minimum distance a being provided between the ends of the two sections 7, 8. This minimum distance a between the facing ends of the cap 4 and carrier element 5 is at least 3 mm, preferably at least 5 mm. This achieves an efficient structure-borne decoupling.

As shown in FIG. 2, the entire carrier element 5 is coated with the elastomer material 6, at least on the side opposite the attachment surface 14. It is also to be noted that the elastomer material 6 also forms the fastening nose(s) 12 with which the second lid element 13 can be held in place on the lid 1. Further, a seal lip 9 is constructed in the area of the first leg 10 at the side of the carrier element 5 facing the attachment surface 14. This seal lip 9 extends beyond the attachment surface of the carrier element 5 (i.e., the surface of the carrier element facing the engine assembly component 3) prior to assembling the lid 1 onto the engine assembly component 3. This seal lip 9 helps ensure a static sealing of the lid on the cylinder head.

FIG. 3 shows an alternative construction of the carrier element 5. Here, the carrier element is comprised of crimped sheet metal. The sheet metal is crimped in the base area of the carrier element 5 that is in contact with the attachment surface 14 and also in the left area of the "U". The sheet metal is crimped and its sides are placed in overlapping relation to each other so that a particularly stable construction is formed. As seen in FIG. 2, only the right side area of the "U" constituting the carrier element 5 is defined by a sheet metal section of a single sheet metal thickness.

The lid is preferably produced in situ by way of an injection molding process or a vulcanization process. That is, the cap 4 and the carrier element 5 are inserted into or positioned in an injection molding tool or vulcanization tool. The elastomer material is then injected into the tool, whereby the elastomer material 6 is permanently fitted or secured to the cap 4 and the carrier element 5, with the connection between the cap and the carrier element being, at least in part, exclusively formed by the elastomer component with the minimum distance a being provided between the facing ends of the cap 4 and the carrier element 5. To achieve this minimum distance or spacing, the cap 4 and the carrier element 5 can be appropriately positioned and held in the tool. This results in a cost effective production as well as a dimensionally stable construction.

The noise muffling lid 1 thus represents an elastomer metal frame containing a wall essentially running vertically toward the attachment surface 14. This geometric construction allows a particularly efficient sound decoupling. The essentially vertically extending wall represents a "softer" decoupling of the sound transmissions than is achieved with other known constructions.

The sealing forces themselves are received by the metallic carrier element 5 so that stability problems occurring in this regard are not as likely to arise. The thermal expansion is also relatively free of problems. Expansions can be compensated without any significant problems by way of the elastomer connection component 6.

In the embodiments described above, the cap 4 is preferably made of plastic, with polyamide being particularly preferred, the carrier element 5 is made of sheet metal, and the elastomer component 6 is preferably made of rubber or silicone. It is also possible to arrange a coupling agent between the cap 4 and elastomer component 6 and/or between the elastomer component 6 and the carrier element 5.

The use of a coupling agent in these contexts is known in the art of producing seal devices to effect a connection between, for example, elastomer material with another member such as a metal member or with another part of, for example, elastomer material. Examples of a suitable coupling agent include silan material, epoxid resin, polyamid resin or phenol resin.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A lid mounted on an upper portion of a cylinder head of an internal combustion engine by way of attachment screws to muffle noises produced by the internal combustion engine comprising:
   a cap;
   the cap having a substantially straight section;
   a carrier element attached to an attachment surface of the cylinder head by the attachment screws;
   the cap and the carrier element being connected to an elastomer component, with the connection between the cap and the carrier element being, at least in part, exclusively constructed by the elastomer component with a space being provided between the cap and the carrier element;
   the carrier element being connected to the elastomer component by virtue of a part of the carrier element being embedded within the elastomer component;
   the carrier element possessing a substantially straight section extending at an angle of at least 60° to the attachment surface of the cylinder head; and
   the substantially straight section of the cap and the substantially straight section of the carrier element being co-linear.

2. The lid according to claim 1, wherein the cap, the carrier element, and the elastomer component are formed in situ by an injection molding process or a vulcanization process.

3. The lid according to claim 1, wherein an end of the cap and an end of the carrier element are connected to the elastomer component and are spaced apart from one another by a distance of at least 3 mm.

4. The lid according to claim 1, wherein an end of the cap and an end of the carrier element are connected to the elastomer component and are spaced apart from one another by a distance of at least 5 mm.

5. The lid according to claim 1, wherein the carrier element is a frame component provided with attachment bores and adapted to a contour of the attachment surface of the cylinder head.

6. The lid according to claim 1, including a coupling agent between the cap and the elastomer component and between the elastomer component and the carrier element.

7. The lid according to claim 1, including a coupling agent between the cap and the elastomer component or between the elastomer component and the carrier element.

8. The lid according to claim 1, wherein the elastomer component includes a seal lip which, prior to attachment to the cylinder head, extends beyond a surface of the bottom portion of the carrier element that faces the upper portion of the engine assembly component.

9. The lid according to claim 1, wherein the carrier element possesses U-shaped cross-section.

10. A lid mounted on an upper portion of a cylinder head of an internal combustion engine by way or attachment screws to muffle noises produced by the internal combustion engine comprising:
    a cap;
    a carrier element attached to an attachment surface of the cylinder head by the attachment screws, the carrier element possesses U-shaped cross-section;
    the cap and the carrier element being connected to an elastomer component, with the connection between the cap and the carrier element being, at least in part, exclusively constructed by the elastomer component with a space being provided between the cap and the carrier element;
    the carrier element possessing a substantially straight section extending at an angle of at least 60° to the attachment surface of the cylinder head;
    the substantially straight section of the carrier element, a portion of the elastomer component adjacent the cap, and a portion of the cap adjacent the carrier element extending in a straight line; and
    wherein the U-shaped carrier element has two legs, the elastomer component being attached to one leg of the U-shaped carrier element for connection to the cap, and being configured at the other leg of the U-shaped carrier element to include a fastening nose for connection to a lid element.

11. The lid according to claim 9, wherein the U-shaped carrier element is comprised of sheet metal crimped so that in at least a portion of the carrier element parts of the sheet metal overlap one another.

12. The lid according to claim 1, wherein the carrier element is made of sheet metal.

13. The lid according to claim 1, wherein the elastomer component is made of rubber or silicone.

14. The lid according to claim 1, wherein the cap is made of plastic.

15. The lid according to claim 1, wherein the cap is made of polyamide.

16. The lid according to claim 1, wherein the substantially straight section of the carrier element extends at a right angle to the attachment surface of the cylinder head.

17. A lid mounted on an upper portion of an engine assembly component of an internal combustion engine by way of attachment elements to muffle noises produced by the internal combustion engine comprising:
    a carrier element attached to the upper portion of the engine assembly component of the internal combustion engine by way of the attachment elements, the carrier element having a substantially U-shaped configuration in cross-section including a bottom portion attached to the upper portion of the engine assembly component by the attachment elements and upstanding inner and outer side portions extending from the bottom portion;
    a cap;
    the cap and the carrier element each having a substantially straight section;

an elastomer component connecting an end of the cap to an end of the carrier element so that the end of the cap and the end of the carrier element, along at least a portion of the lid, are spaced apart from one another exclusively by a portion of the elastomer component;

the end of the carrier element being connected to the elastomer component by virtue of the end of the carrier element being embedded within the elastomer component; and the substantially straight section of the cap and the substantially straight section of the carrier element being co-linear.

18. A lid mounted on an upper portion of an engine assembly component of an internal combustion engine by way of attachment elements to muffle noises produced by the internal combustion engine comprising:

a carrier element attached to the upper portion of the engine assembly component of the internal combustion engine by way of the attachment elements, the carrier element having a substantially U-shaped configuration in cross-section including a bottom portion attached to the upper portion of the engine assembly component by the attachment elements and upstanding inner and outer side portions extending from the bottom portion;

a cap;

the cap and the carrier element each having a substantially straight section;

an elastomer component connecting an end of the cap to an end of the carrier element so that the end of the cap and the end of the carrier element, along at least a portion of the lid, are spaced apart from one another exclusively by a portion of the elastomer component; and the substantially straight section of the cap and the substantially straight section of the carrier element being co-linear;

wherein the end of the cap and the end of the carrier element that are connected by the elastomer component are spaced apart from one another by a distance of at least 3 mm.

19. The lid according to claim 17, wherein the end of the cap and the end of the carrier element that are connected by the elastomer component are spaced apart from one another by a distance of at least 5 mm.

20. The lid according to claim 17, wherein the carrier element is a frame component provided with attachment bores in which are positioned the attachment elements.

21. The lid according to claim 17, wherein the elastomer component includes a seal lip which, prior to attachment to the engine assembly component, extends beyond a surface of the bottom portion of the carrier element that faces the upper portion of the engine assembly component.

22. The lid according to claim 17, wherein a portion of the elastomer component is attached to the inner side portion of the U-shaped carrier element, another portion of the elastomer component being attached to the outer side portion of the U-shaped carrier element and being configured to define a fastening nose to which a lid element is mounted.

23. The lid according to claim 17, wherein the U-shaped carrier element is comprised of sheet metal crimped so that in at least a portion of the carrier element parts of the sheet metal overlap one another.

24. The lid according to claim 17, wherein the elastomer component is made of rubber or silicone.

25. The lid according to claim 17, wherein the cap is made of plastic.

26. Method for producing a lid to be attached to an engine assembly component of an internal combustion engine by way of attachment elements to muffle noises produced by the internal combustion engine, comprising:

positioning a cap and a carrier element in a tool, the cap and the carrier element each having a straight section;

injection molding elastomer material into the tool so that the cap and the carrier element are permanently connected to the elastomer material which forms an elastomer component of the lid, and so that the connection between the cap and the carrier element is at least in part exclusively formed by the elastomer component with a distance being provided between the cap and the carrier element; and so that the straight section of the cap and the straight section of the carrier element are co-linear, with portions of the straight sections of the carrier element and the cap being embedded within the elastomer component to form the permanent connection.

27. The method according to claim 26, wherein the tool is an injection molding tool.

28. The method according to claim 26, wherein the tool is a vulcanization tool.

29. The method according to claim 26, wherein the carrier element possesses a substantially straight section extending away from a bottom portion of the carrier at an angle of at least 60° to the bottom portion, the cap and carrier element being positioned in the tool so that after injection molding, the substantially straight section of the carrier element, a portion of the elastomer component adjacent the cap, and a portion of the cap adjacent the carrier element extend in a straight line.

* * * * *